(12) United States Patent
Töpfer (10) Patent No.: US 7,392,642 B2
(45) Date of Patent: Jul. 1, 2008

(54) PACKAGING DEVICE FOR FREE-FLOWING BULK MATERIAL (FILLING)

(75) Inventor: Klaus Töpfer, Munich (DE)

(73) Assignee: Poly-Clip System GmbH & Co. KG (DE)

( * ) Notice: Subject to any disclaimer, the term of this patent is extended or adjusted under 35 U.S.C. 154(b) by 62 days.

(21) Appl. No.: 11/257,492

(22) Filed: Oct. 24, 2005

(65) Prior Publication Data
US 2007/0089379 A1 Apr. 26, 2007

(30) Foreign Application Priority Data
Oct. 21, 2005 (DE) .................. 10 2005 050 614

(51) Int. Cl.
*B65B 9/10* (2006.01)
*A22C 11/00* (2006.01)

(52) U.S. Cl. .............. 53/567; 53/574; 452/26; 452/30

(58) Field of Classification Search .......... 53/567, 53/574, 575, 576, 577; 452/21, 22, 26, 30, 452/31, 32, 35, 37, 46, 47, 48, 51
See application file for complete search history.

(56) References Cited

U.S. PATENT DOCUMENTS

| | | | | |
|---|---|---|---|---|
| 2,607,696 A * | 8/1952 | Kunz | ............... | 426/413 |
| 3,659,317 A * | 5/1972 | Kupcikevicius | ............... | 452/35 |
| 3,703,064 A * | 11/1972 | Lugiewicz | ............... | 53/122 |
| 3,964,236 A * | 6/1976 | Smith | ............... | 452/34 |
| 4,047,360 A * | 9/1977 | Minaev et al. | ............... | 53/122 |
| 4,563,792 A * | 1/1986 | Niedecker | ............... | 452/31 |
| 4,887,332 A | 12/1989 | Evans et al. | | |
| 4,955,109 A * | 9/1990 | Evans et al. | ............... | 452/35 |
| 4,991,260 A * | 2/1991 | Nausedas | ............... | 452/35 |
| 5,042,234 A * | 8/1991 | Evans et al. | ............... | 53/523 |
| 5,203,142 A * | 4/1993 | Kollross | ............... | 53/436 |
| 6,139,416 A * | 10/2000 | Topfer | ............... | 452/31 |
| 6,146,261 A * | 11/2000 | Bienert et al. | ............... | 452/32 |
| 6,875,100 B2 * | 4/2005 | Topfer | ............... | 452/40 |
| 2005/0053699 A1 | 3/2005 | Whittlesey et al. | | |

* cited by examiner

*Primary Examiner*—Rinaldi I. Rada
*Assistant Examiner*—Paul Durand
(74) *Attorney, Agent, or Firm*—Hahn Loeser & Parks LLP; Michael H. Minns (57) ABSTRACT

The invention pertains to a device for the packaging of free-flowing fill materials in a tube-shaped casing with a feeder tube to conduct the flow of fill materials. The feeder tube features a hookup, a mouth, a basically straight first segment adjoining the hookup, with a first longitudinal axis, and a second segment that is conjoined with the first segment and proximate to the mouth. The first segment is designed to accept and conduct a casing on its outer surface. The casing infeed consists of a plastic filmstrip, which is formed into a tube around the first feeder tube segment. The second segment is designed to further conduct the plastic filmstrip-derived, newly formed casing. Alternatively, a supply of casing and/or net material may be loaded onto the second segment from its mouth. Upstream and ahead of the first segment, the feeder tube features a feeder tube swivel bearing (140) around the first longitudinal axis. There is at least one change of feeder tube direction between the first and second segments.

17 Claims, 12 Drawing Sheets

Fig. 12

PACKAGING DEVICE FOR FREE-FLOWING BULK MATERIAL (FILLING)

This application claims the benefit of German patent application serial number 10 2005 050 614.3, filed Oct. 21, 2005, and is hereby incorporated by reference.

TECHNICAL FIELD

The invention pertains to a packaging device for free-flowing bulk materials in a casing (a tube-like flexible covering). Part of the packaging device is a feeder tube, which attaches to the fill unit, and brings the stream of fill material from the fill unit to the closing unit for the casing. Feeder tube features are a hookup, a mouth, and a largely straight first segment with a first longitudinal axis next to the hookup and a second segment proximate to the mouth that conjoins with the first segment. The first feeder tube segment is designed to accept and conduct an infeed of plastic film and form it into a casing around its outer surface. The second feeder tube segment accepts and conducts the casing (derived from the plastic filmstrip) or alternatively, accepts and conducts a supply of casing after it has been manually loaded onto the second segment from the mouth end.

BACKGROUND OF THE INVENTION

As outlined, the fill unit delivers the fill material under pressure into the feeder tube at the hookup. The fill material is transported or conducted through the feeder tube to the closing unit. The casing moves over the outer surface of the feeder tube toward the closing unit. Adjacent to the closing unit, the fill material emerges from the feeder tube mouth and fills the casing, which is sealed with a clip at the leading end. Once the specified or desired fill portion is reached, constricting elements in the closing unit partition off the stuffed casing, thus creating an empty, collapsed casing segment for the sausage end. Usually, two sealing clips are placed one after the other around the collapsed casing at the sausage end and closed using punching tools. Now, the casing may be cut with a knife between sealing clips.

It is also known how to make the required casings for sausages or similarly packaged items on site as part of the packaging process. The methods involve forming the plastic filmstrip and then closing the longitudinal seam either continuously or intermittently using a sealing device. An example of such a sealing method is known from European patent EP 0 908 103 A1, in which a feeder mechanism first pushes the plastic film strip over a forming pad and then pulls it through a sealing device. The forming pad encircles the feeder tube and covers a short section of it with the plastic filmstrip in such a way that its longitudinal edges either meet each other flush or overlap. The sealing device fuses overlapping plastic film edges directly, in cases where the longitudinal edges meet flush, a sealing band that covers the adjoining edges is added before the fusion process. Sealing is defined as forming any permanent seal between the longitudinal edges of the plastic filmstrip. This may, for example, be accomplished through the preferred fusion method or alternatively, also through bonding.

The casing is formed in the above-described way as a quasi-endless plastic film tube. Infeed drives then push the tube forward over the feeder tube to a segment where a casing supply accumulates (bunches up) in harmonica folds. There has to be an excess casing supply when the sealing process (continuous or intermittent) is slower than the filling process, during which the forced output of filling intermittently pulls the casing off the feeder tube.

Other known versions of sealing devices do not require an infeed drive because there are no extra folds of casing supply. With these devices, the casing is consecutively sealed and filled in a synchronized rhythm. During the fill process, the forced output of filling directly pulls the casing off the feeder tube, while the sealing device is on standby.

Still longer known in sausage making are methods, in which the required supply of ready-made casing is manually pushed onto the outer feeder tube from its mouth end, e.g. in harmonica-like folds. Through the filling output, the required length of the casing is pulled off the feeder tube against the friction from the brake ring of a retaining device. Once exhausted, new casing must be supplied. To apply the new casing, the feeder tube is pivoted out from its operating/fill position gain free access to the feeder tube mouth. Even today, casing is applied to the feeder tube in this way when it is not cost-effective to produce the casing continuously from plastic filmstrips, e.g. when using natural casing or when producing small quantities of sausages of variable caliber.

SUMMARY OF THE INVENTION

The ideal device for the packaging of free-flowing material in a tube-like casing allows two operating modes: The first (automatic) operating mode involves the production of quasi-endless casing as part of the packaging process, and in the second (manual) operating mode, a casing supply is loaded by hand. As initially outlined, such a device is familiar from US 2005/0053699 A1. The device features a first feeder tube for the automatic operating mode. Its first feeder tube segment is located inside the housing with the sealing device. The plastic filmstrip is formed and sealed around this first segment. The second segment of the feeder tube extends by a certain length from the sealing device and its housing and carries both, the newly formed casing on its outside and the fill material inside, to the closing unit for the casing at its mouth.

The first feeder tube is releasably attached to the housing with the sealing device. A second feeder tube assembly may replace it for the second operating mode. The second feeder tube assembly consists of a first feeder tube segment that spans the housing for the sealing unit, which is inactive in this operating mode. A second feeder tube segment outside the housing is flange connected to the first feeder tube segment. The second segment features a swivel joint and can therefore pivot around the axis of the first segment. The lengths of the second segments in the first and second feeder tube assemblies are identical. The first and second segments of the second feeder tube assembly are coaxial when the mouth of the second segment is in the effective range of the sealing device (operating position of the second feeder tube assembly). This ascertains that the distances and positions of fill unit, sealing device and sausage closing unit do not have to be adjusted with a change in operating mode. With the second segment of the second feeder tube assembly swiveled out of its operating position into its provisioning position, a supply of casing can be manually added around it from its mouth. The feeder tube mouth is then pivoted back into its operating position nearest to the closing unit.

The objective of the present invention is to create a device of the above-described type, but simpler in design and easier to handle.

This objective is met for the above-described type of device through the following design elements: A feeder tube swivel bearing is located upstream, in front of the first feeder tube segment, pivoting around the first longitudinal axis, and there is at least one change of direction between the first and second feeder tube segments.

According to the present invention, and in contrast to the device known from patent US 2005/0053699 A1, the same feeder tube can be used in both operating modes, either in combination with the sealing device in the first operating mode or with a manually loaded source of casing in the second operating mode. In the first operating mode, the plastic filmstrip is loaded onto the first feeder tube segment where it is shaped into a casing and sealed. The endless plastic film casing then moves over the first and second segments of the feeder tube to its mouth and to the closing unit next to it.

The feeder tube swivel bearing makes it possible to pivot the entire feeder tube around the first longitudinal axis of the first feeder tube segment when operations are to be switched to manual load of casing and/or net supplies. Based on the change of direction, this pivoting action turns the second feeder tube segment out of the range of the adjoining closing unit and consequently, from its operational position into its provisioning position. Unlike in the second feeder tube assembly of the known device, the change of direction is permanent and not variably pivoted. In this position, the casing is loaded onto the second segment from the feeder tube mouth. The feeder tube is then pivoted back around the longitudinal axis of the first feeder tube segment into its operating position.

Without having to replace or detach the entire feeder tube or a part of it, the invention-based device thus allows it to switch operating modes from an automatic feed of a quasi endless plastic film casing to the manual load of a casing supply (plastic film casing and/or net materials). The use of a single all-purpose feeder tube makes handling the device easier and also eliminates the need for a pivot joint to swivel a segment of the feeder tube. In contrast to the second feeder tube assembly of the known device, the change in direction is permanent. Advantageously, this makes it possible to engineer the entire feeder tube with its first and second segments in one workpiece. The advantages of this design are the enhanced inherent stability of the feeder tube and also its cost-effective production by shaping a cranked tube from a straight one.

In an easy to execute design, the second feeder tube segment is basically straight with a second longitudinal axis, which includes an angle of <180° with the first longitudinal axis of the first feeder tube segment. In other words, the axes of the two segments do not run parallel, thus defining a fixed change in direction.

In an alternative design, the second feeder tube segment is basically also straight and has a second longitudinal axis. However, an intermediate segment is inserted between the first and second feeder tube segments in such a way that the first and second longitudinal feeder tube axes run indeed parallel but staggered. In this design, the orientation of the feeder tube changes twice, once between the first feeder tube segment and the intermediate piece and a second time between intermediate piece and the second segment. The advantage of this design is the parallel positioning of the sealing device and the closing unit at the feeder tube mouth. This is in contrast to the aforementioned design, which must arrange for an angle between the sealing device and the closing unit at their respective feeder tube ends to match the angle between the first and second feeder tube segments. The design allows a different Installation and orientation of the components, and it gives the user more layout choices.

In an advantageous design, a net holder encases the second feeder tube segment at least partially, and a net holder swivel bearing allows pivoting it around the first longitudinal axis.

Some sausage products have an extra net casing around the plastic film casing to achieve better stability or more visual and aesthetic impact. During production and filling, their plastic film casing and the net material are pulled off simultaneously from the feeder tube and the outer net holder, respectively. Pertinent procedures and devices are known. However, they cannot be combined with a pivoted feeder tube, let alone with a type of device as established in US 2005/0053699 A1.

The present invention now provides a remedy by adding a net holder swivel bearing that allows pivoting of the net holder around the first longitudinal axis. This independent aspect of the present invention permits pivoting of the feeder tube and the net holder around the same axis of rotation. Even though the net holder at least partially encases the second feeder tube segment, it does not have to be completely removed from the device when, for example, the feeder tube pivots into the provisioning position, as perhaps expected. When a change in orientation pivots the second feeder tube segment that pivot motion drags along the net holder. This permits the infeed of net casing to the net holder and incidentally, also the infeed of net casing in both operating modes.

In a favorable implementation of the feeder tube swivel bearing, the device features a support structure to which the first element of the feeder tube swivel bearing is attached. In this assembly, the feeder tube can be attached to a second element of the swivel bearing.

In an advantageous design, the feeder tube has a coaxial flange upstream in front of the first segment, which can be inserted in the first element of the feeder tube swivel bearing and, through clamping, can be releasably connected to the second element of the feeder tube swivel bearing. This makes it easy to remove or reinstall the feeder tube, e.g. for the purpose of cleaning or maintenance.

Advantageously, the feeder tube flange is sealed at its periphery from the first element of the swivel bearing. From the fill unit, the fill materials usually enter the feeder tube under pressure, and the seal prevents the fill material from entering the feeder tube swivel bearing.

It is advantageous when the first element of the feeder tube swivel bearing has a flange to connect it with the fill unit. This combines the feeder tube swivel bearing and the flange connection for the feeder tube in one element.

In an advantageous development, a forming pad encircles part of the first segment of the feeder tube where the infeed of plastic filmstrip is formed into a casing. Placing the longitudinal edges of the filmstrip together, edge to edge pre-forms the casing. A sealing device is located in the same first feeder tube segment downstream of the forming assembly where the adjacent longitudinal edges of the pre-shaped casing are fused or sealed on the feeder tube. In this process, the longitudinal edges of the plastic filmstrip may meet flush, edge against edge, on the feeder tube. A sealing strip must then cover the seam, while overlapping edges of a plastic film are sealed directly.

Advantageously, the sealing unit is located inside a housing, which also serves as a support structure for the feeder tube swivel bearing, with the first element of the feeder tube swivel bearing protruding from the housing. This makes the flange for the connection to the fill unit freely accessible from the outside without having to open the housing.

According to an advantageous implementation of the present invention, the first feeder tube segment downstream of the sealing unit is supported by at least one rolling element. This reduces the torque on the feeder tube swivel bearing due to the length of the feeder tube.

Advantageously, at least two angularly offset rolling elements stabilize the feeder tube. This further abuts the feeder tube and so reduces the torque on the feeder tube swivel bearing.

It is advantageous to employ pivoted rolling elements, which abut the first feeder tube segment in a V-shaped arrangement and in turn, pivot between two positions. In the first position, they pivot vertically in relation to the first longitudinal axis of the first feeder tube segment and parallel to this axis in the second position.

In the first operating mode, the quasi-endless casing is moved over the first feeder tube segment and passes between rolling elements and feeder tube surface. The vertical orientation of the rolling element axes in relation to the longitudinal axis of the first feeder tube segment ensures that no frictional resistance at the rolling elements hinders the movement of the casing. In the second operating mode, a casing supply is manually loaded onto the second feeder tube segment from the feeder tube mouth so that the casing never comes in contact with the rolling elements. The rolling elements axes can therefore be oriented parallel to the longitudinal axis of the first feeder tube segment, and so the feeder tube rotation around the first longitudinal axis is almost without friction.

Advantageously, the device features a drive for the rotation of the feeder tube around the longitudinal axis with a drive motor, a first gear element that is connected to the first segment, and a second gear element that couples to a drive motor.

The first gear element, for example, can be a gear ring, which interlocks with a worm gear as a second gear element. This second gear element is coupled with a drive motor. In this case, the drive motor is an electric motor, for instance. In case the drive motor is a hydraulic piston & cylinder motor, for instance, then the second gear element can be a gear rack, which interlocks with the gear ring.

BRIEF DESCRIPTION OF THE DRAWINGS

Further uses, attributes and advantages of the present invention will now be further discussed.

DETAILED DESCRIPTION OF THE INVENTION

In the illustrations, components with identical function are labeled with identical numbers; modified components with predominantly similar functions are labeled with identical numbers followed by apostrophes.

Figure 1:
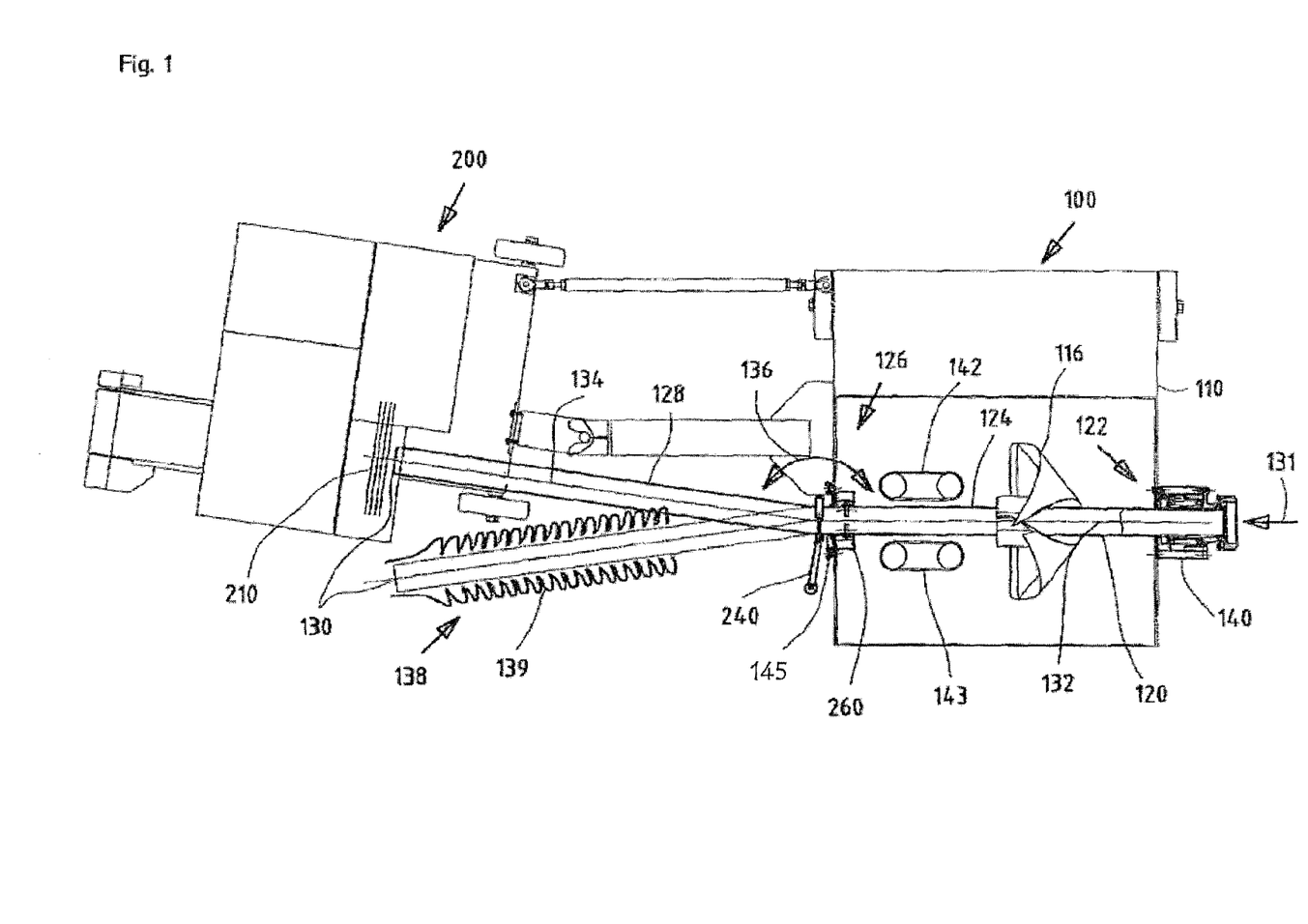
FIG. 1 Top view showing a first design of the invention-based device with an angled feeder tube.

FIG. 1 shows in top view a system to package free-flowing fill materials in a tube-like casing. The system features device 100 according to the present invention and also shows downstream at the feeder tube mouth a closing unit 200, which partitions and seals the filled (sausage) casing.

The device 100 has a housing 110 for components, such as the sealing unit (not shown in this view), a forming unit or forming pad to transform a plastic film strip in a plastic film casing 118 as well as an infeed unit 142 that consists of two conveyor bands 142, 143 to advance the sealed plastic film casing 118 in automatic operating mode. Details for the sealing device follow below as part of the description to FIG. 2. The device 100 also includes a feeder tube 120 with a hookup 122, a first segment 124 inside the housing 110, a change in direction 126, a second segment 128 outside the housing 110 and a mouth 130 at the end of the second feeder tube segment. The feeder tube 120 has an end-to-end hollow profile. Fill material is transported through its lumen from the feeder tube hookup at the infeed unit (not shown) to the feeder tube mouth 130. The arrow 131 at the hookup indicates the direction of flow.

A dash-dotted line 132 marks the center or longitudinal axis of the first straight feeder tube segment 124. The second feeder tube segment 128 is also straight. The dash-dotted line 134 indicates its midline or longitudinal axis (second longitudinal axis of the feeder tube). The longitudinal axes 132 and 134 of the first and second feeder tube segments do not run parallel but rather intersect at the point where the feeder tube changes direction 126. The angle 136 between the two axes is <180°. In the illustration shown here, the angle is about 172°. Therefore, the closing unit located proximate to the feeder tube mouth 130, slants relative to the sealing device 100 by about 8°. This assembly orients the closing unit 200 and its work plane 220 vertical to the second longitudinal axis 134. Moving in the work plane inside the closing unit 200, constricting elements partition off the filled casing, and closing tools set and tighten the clips around the casing.

Close to the hookup 122, and upstream in front of the first feeder tube segment 124, the feeder tube has a feeder tube swivel bearing 140. As will be further elucidated in reference to FIG. 5, the feeder tube swivel bearing 140 is assembled at the housing 110 and affixed to it. The swivel bearing radial supports and positions the feeder tube 120, and makes it possible to pivot the entire feeder tube 120 around the first longitudinal axis 132. Such a pivot motion moves the second feeder tube segment 128 from its operating position (indicated by a solid line) to its provisioning position 138 (indicated by a double dash-dotted line).

In the provisioning position, the mouth 130 at the end of the second feeder tube segment 128 is freely accessible and a supply of compressed casing or net material 139 can be manually loaded from the feeder tube mouth 130 onto the second segment 128. Pivoting into the provisioning position does not necessarily involve a rotation of 180° around the first longitudinal axis, as depicted here. As the space permits, a required rotation by more or less than 180° is feasible. The direction of the swivel motion is optional and may be clockwise or counter-clockwise. After the casing has been loaded onto the second feeder tube segment 128, the entire feeder tube can be pivoted back into its operating position in order to resume or start the production of sausages.

Figure 10A:
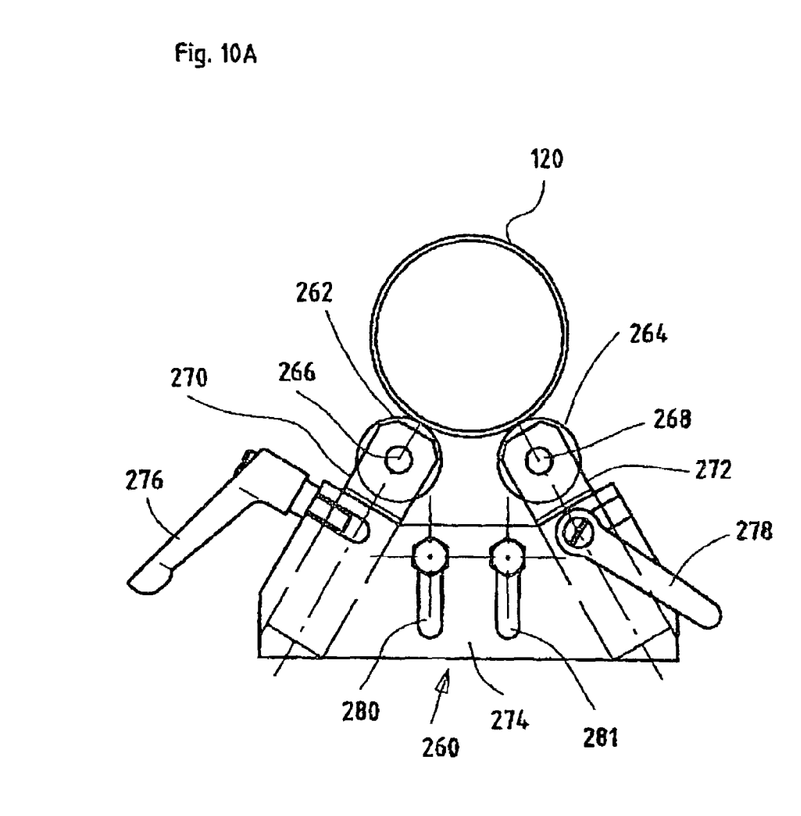
FIG. 10A, 10B Two detail views from inside the housing, showing the support structures in the first feeder tube segment according to the design shown in FIG. 9.
Figure 10B:
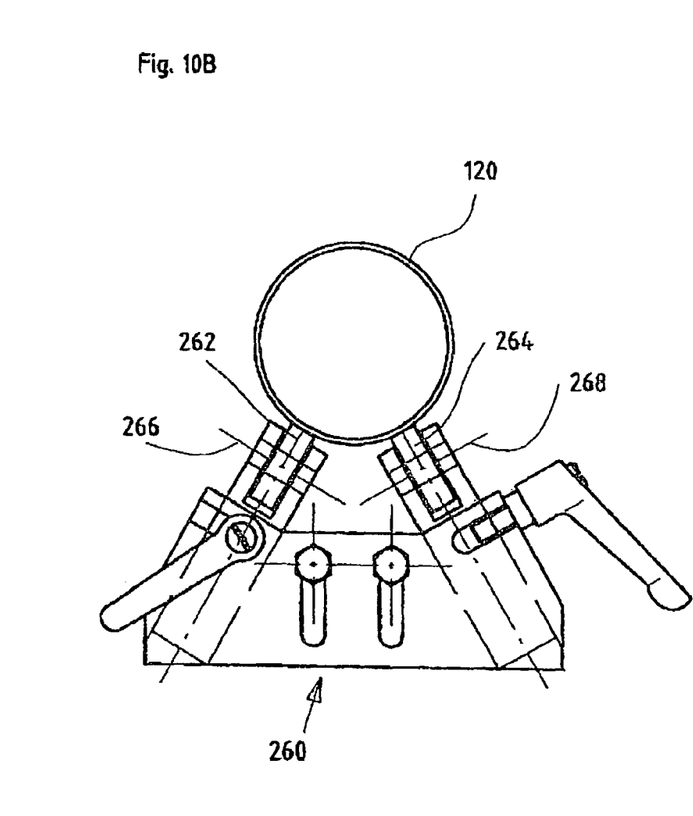

The truss 260 under the first segment 124 of the feeder tube 120 on the wall of the housing 110 and opposite the swivel bearing 140 reduces torque on the swivel bearing 140. Details are given with reference to FIG. 10.

A short section of the first feeder tube segment 124 protrudes downstream of the truss 145 from the housing 110. A faceplate 149 provides a seal between housing and feeder tube 120 (see further details with reference to FIG. 9). The faceplate is necessary during manual operations to exclude water from the housing 110 for the sealing unit.

Located farther downstream but still in the range of the first feeder tube segment 124, is a handle 240 to rotate the feeder tube 120 around the first longitudinal axis 132. The handle is described in more detail with reference to FIGS. 9 and 11.

Figure 2:
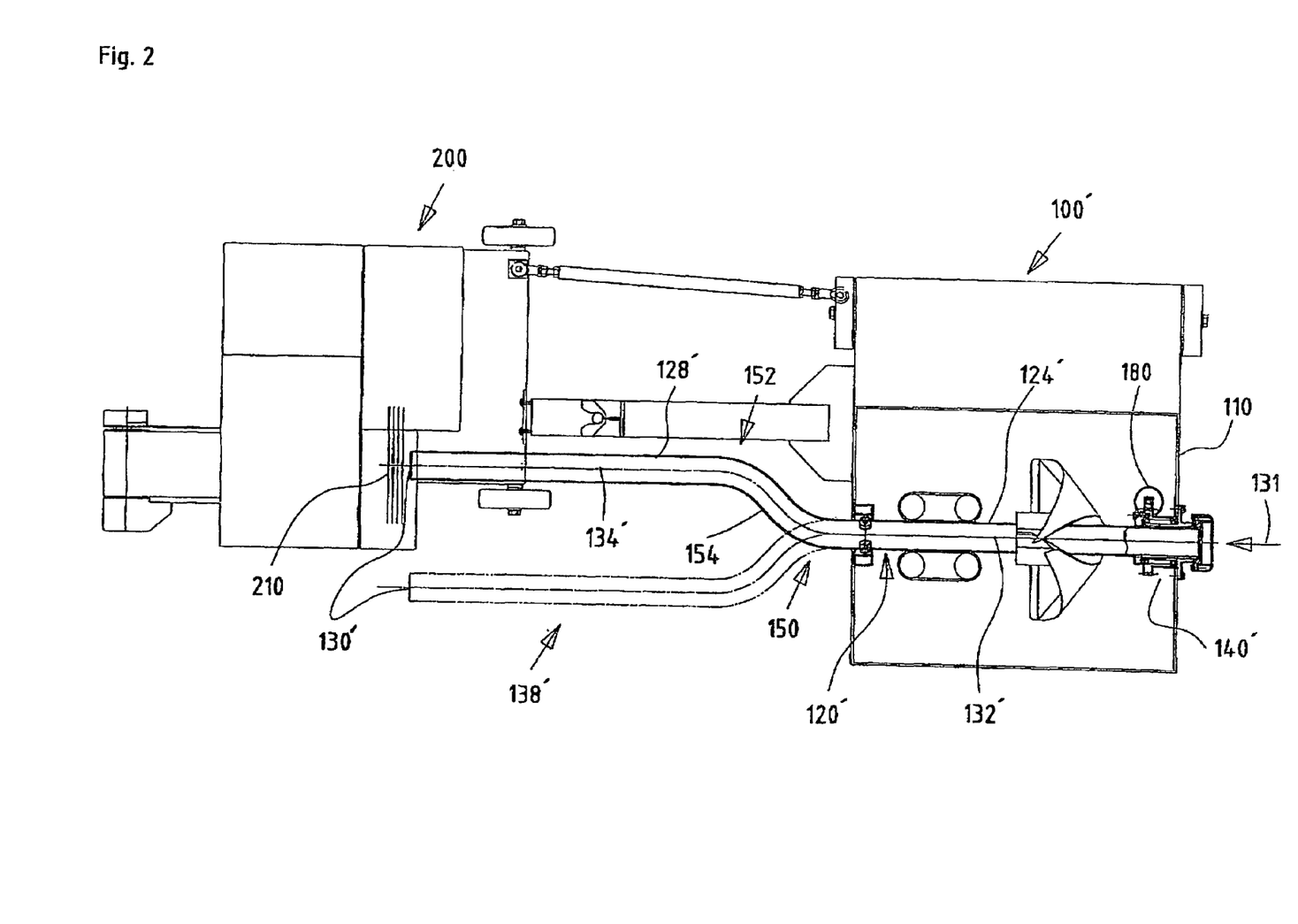
FIG. 2 Top view showing a second design of the invention-based device with offset feeder tube segments.

FIG. 2 shows in top view a different design for the invention-based device 100' as well as the closing unit 200 proximate to the feeder tube mouth. Different from the design according to FIG. 1, here the feeder tube 120' features two changes of direction 150, 152 between its first segment 124' and its second segment 128'. An intermediate segment 154 between the two changes of direction connects feeder tube segments 124' and 128'. The longitudinal axes 132', 134' of the first feeder tube segment 124' and the second segment 128' run parallel. In the operating mode shown here, axes 132' and 134' are offset horizontally, i.e., they are offset in the horizontal image plane. Therefore, the work plane 210 of the closing unit 200 can be arranged vertical to the longitudinal axis 134' of the second feeder tube segment 128' and in general, also parallel to the feeder tube mouth. The constrictive elements and punching tools to close the casing operate in work plane 210.

Rotating the feeder tube 120' around its first longitudinal axis 132' pivots the intermediate segment 154 and the second feeder tube segment 128' from their operating position (indicated by a solid line) to the provisioning position 138' (indicated by the double dash-dotted line). In this provisioning position, the mouth of the second feeder tube segment 128' is freely accessible so that it can be manually loaded with new casing supply—the same as in the first mentioned invention-based design.

However, the latter is unnecessary in the automatic operating mode, which is shown in FIG. 2. In comparison with the design attributes shown in FIG. 1, the continuous production of plastic film casing calls for another design modification, namely the omission of the face plate that seals the housing. If present, the faceplate would interfere with the transport of casing as it exits from the housing 110.

The device 100' according to FIG. 2 also does not have a handle to rotate the feeder tube. A motor 180 drives the rotation in this design. The two versions also differ in the implementation of the swivel bearing 140'. In unit 100' according to FIG. 2, the swivel bearing 140' is no longer located outside but inside the housing 110. This design permits a more compact construction and also protects the drive motor 180, now an integrated component inside the housing 110. More details are given in FIG. 4 about the swivel bearing and in FIG. 12 about the drive.

Figure 3:
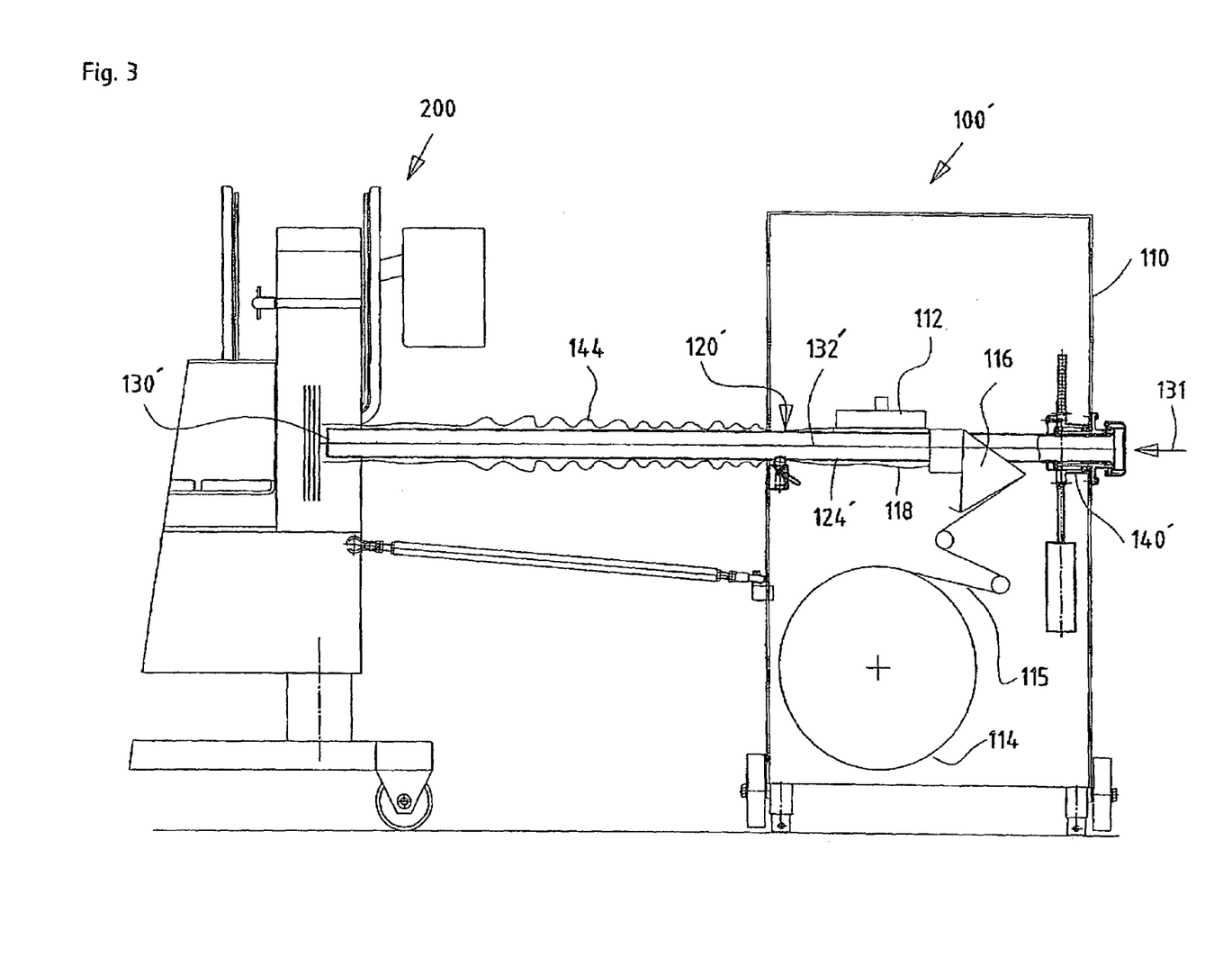
FIG. 3 Side view showing the device in FIG. 2.

FIG. 3 shows unit 100' in side view according to the design in FIG. 2. The feeder tube 120' is in its operating position. In side view, a change in feeder tube direction is hidden from view because the entire feeder tube 120' in FIG. 3 lies in the horizontal plane, i.e. vertical to the image plane (cf. FIG. 2).

Aside from the forming pad 116 and the transport unit 142 from FIGS. 1 and 2, the housing for device 100' also contains the already mentioned sealing unit 112 and plastic filmstrip 115 on a supply roll 114. The plastic filmstrip is moved over the forming pad 116 where its longitudinal edges are brought together edge-to-edge to form a plastic tube. Using the sealing unit 112 (here shown simplified as a sealing bar), the adjacent plastic film edges are then sealed to form the finished casing. For the sealing process, the sealing bar 112 is pressed against the adjacent edges of the plastic film 115, i.e. the preformed, not yet sealed plastic film tube 118. The first section of the first feeder tube segment 124 serves as a counter bearing in this process.

The conveyor bands 142, 143 continuously pull the casing 118 out from underneath the sealing bar 112 to prevent the casing seam from melting all the way.

The sealing process in this operation is continuous, while on the side of the closing unit 200 the filling, partitioning and closing proceeds intermittently. Therefore, a supply of casing 144 is allowed to gather (bunch up) in folds on the feeder tube. It is known how to register the length of the casing supply with sensors and trigger the on/off switch for the sealing unit as needed.

As an alternative to the continuous production of sealed casing, the sealing can also be synchronized with the filling, partitioning and closing processes. In time with the sealing of the longitudinal edges of the plastic film strip, the sealing bar 112 can, for example, be moved off the preformed, still open plastic film tube to interrupt the sealing process and lowered back on the preformed casing to resume the sealing.

Figure 4:
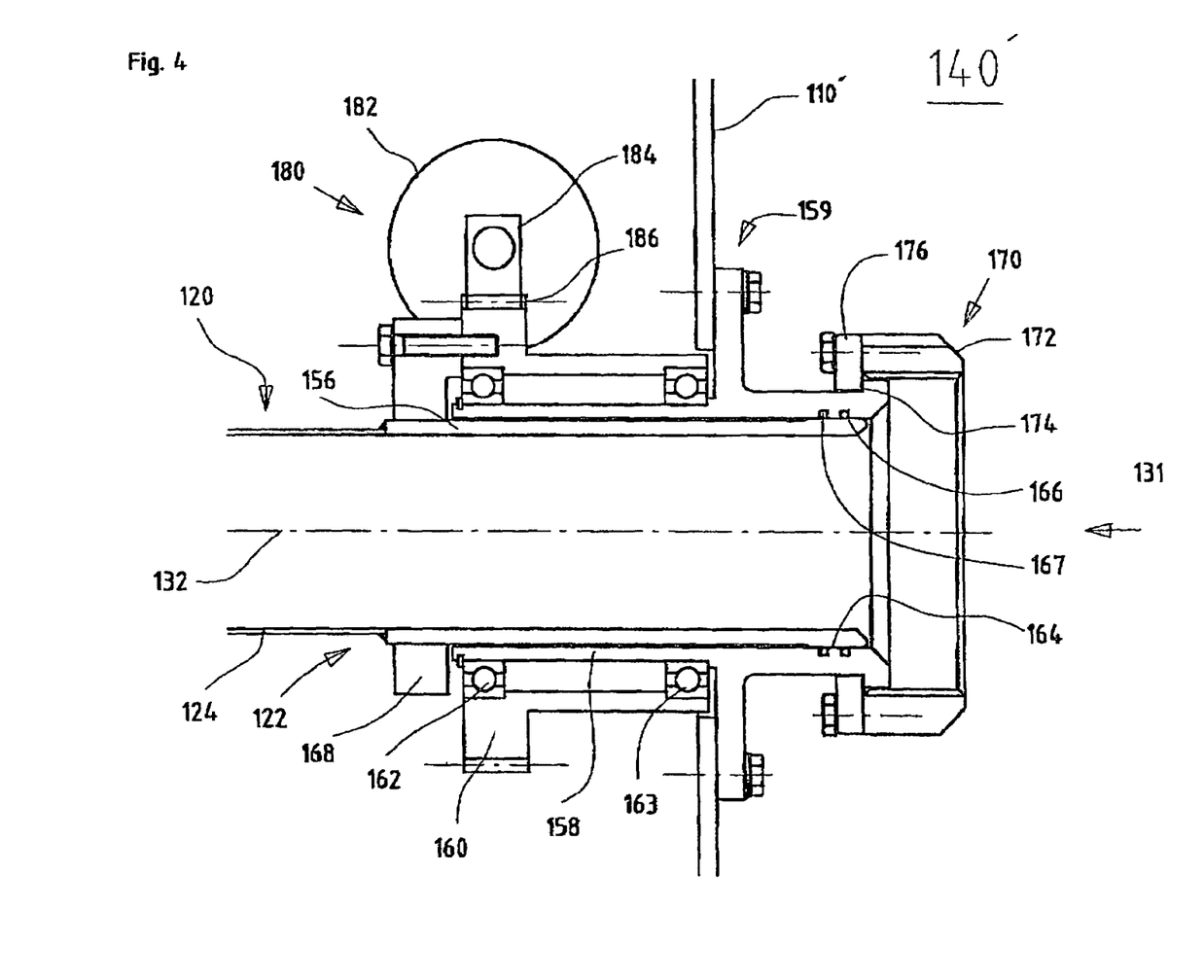
FIG. 4 Detail view showing a cross-section of the connecting area with the feeder tube swivel bearing according to a first design.

FIG. 4 shows a detail view of the invention-based device around the hookup 122 and the feeder tube swivel bearing 140', respectively. The hookup 122 features a flange 156 with a larger outer diameter than the feeder tube but preferably with the same inside diameter to achieve a constant flow diameter. The flange 156 runs coaxial with the first feeder tube segment 124 and is connected to it through a weld seam, for example. When different feeder tubes are used e.g. for different sausage calibers, the flange is used to keep the outer diameter constant and the different feeder tubes compatible with always the same feeder tube swivel bearing 140'.

The feeder tube swivel bearing 140' consists basically of a first element 158, which is attached to the housing for the sealing device, or more precisely, with a wall segment 110' of the housing and a second element 160, which pivots around element 158. The second element 160 can be attached to the feeder tube segment 120. From the outside, the first element 158 is directly flanged with a flange section 159 to the housing wall 110'. This turns the housing 110 into a structural support for the feeder tube swivel bearing. According to the design shown in FIG. 4, the second element 160 is seated radial on the first element 158 via two cylinder bearings 162, 163. In this assembly, the second element 160 and the cylinder bearings reside inside the housing, or precisely, at the inner wall of housing 110'.

The feeder tube 120 with flange 156 is inserted in the first element 158 of the feeder tube swivel bearing. The swivel bearing is sealed from the feeder tube using two O-rings 166, 167, which are seated around the outer feeder tube on the seal surface 164. The fill material is usually pushed under pressure from the fill unit into the feeder tube, and the seal keeps it from entering the feeder tube swivel bearing 140. Furthermore, clamping means 168 releasably connects the feeder tube 120 at its flange 156 with the second element 160 of the swivel bearing 140'. The feeder tube position is therefore radial to the first element 158 and opposite the housing. Once the clamp 168 is opened, the feeder tube can be pulled out from the first element 158 of the swivel bearing 140' and removed for cleaning and maintenance.

On the first element 158 of the feeder tube swivel bearing on the outside of the housing 110, a flange 170 is provided to connect the fill unit upstream (not shown). As is known, the fill unit contains a pump with an extruder to infeed fill material downstream in direction 131. The flange has a coupling nut 172, which is adapted to the fill unit. Using undercuts 174 at the first element 158 and a split retaining ring 176, the coupling nut forms a non-losable connection with the feeder tube swivel bearing 140.

A motor drive 180 generates the feeder tube rotation around axis 132 of the first feeder tube segment 124. The drive features a linear drive motor 182 and a pneumatic or hydraulic cylinder/piston assembly. A toothed rack 184 is attached to the piston and transmits the linear piston movement to the gear ring 186, which is affixed to the second element 160 of the feeder tube swivel bearing 140, and thus finally to the feeder tube 120 (cf. FIG. 12).

In the place of the linear drive motor, an electric torque (rotation) drive motor, for example, may also be used. The rotational force is transmitted via a gear (worm gear, rack-wheel or belt drive) to the second element 160.

Figure 5:
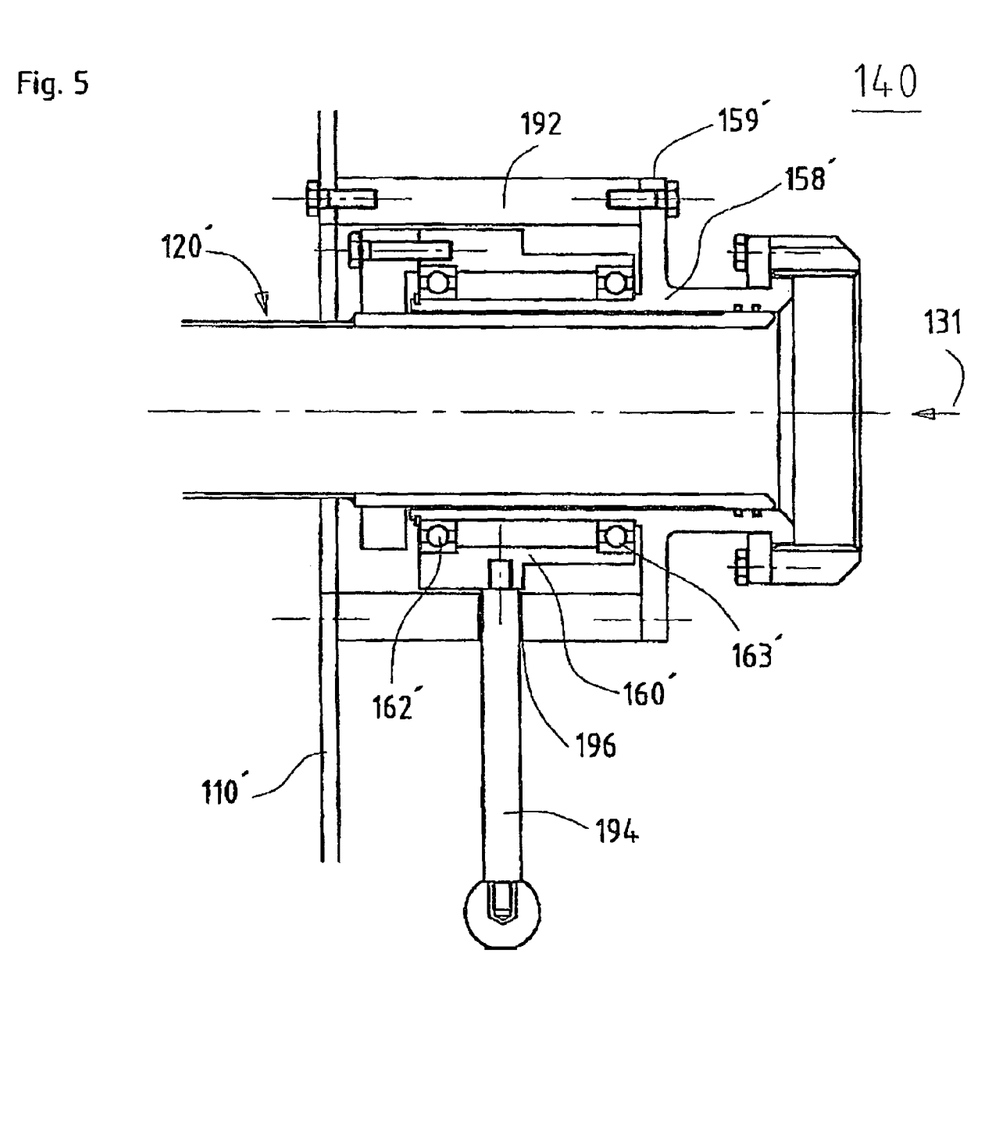
FIG. 5 Detail view showing a cross-section of the connecting area with the feeder tube swivel bearing according to a second design.

FIG. 5 shows an alternative design for the feeder tube swivel bearing as depicted in FIG. 4, in which the first element 158' with the flange segment 159' via the spacer bushing 192 is flange connected to the housing wall from the outside. The bushing length 192 is determined in such a way that the second element 160', including the cylinder bearings 162', 163', is now positioned inside the first element 158' outside on the housing wall 110'.

As an alternative to the pneumatic motor drive in FIG. 4, the design here shows a simple handle 194 for the manual rotation of the feeder tube 120'. Different from the design in FIG. 1, the handle 194 does not act upon the first feeder tube segment 124, but directly on the second element 160' of the feeder tube swivel bearing 140'. The handle 194 is guided to the outside through a slot 196 in the bushing 192.

Figure 6:
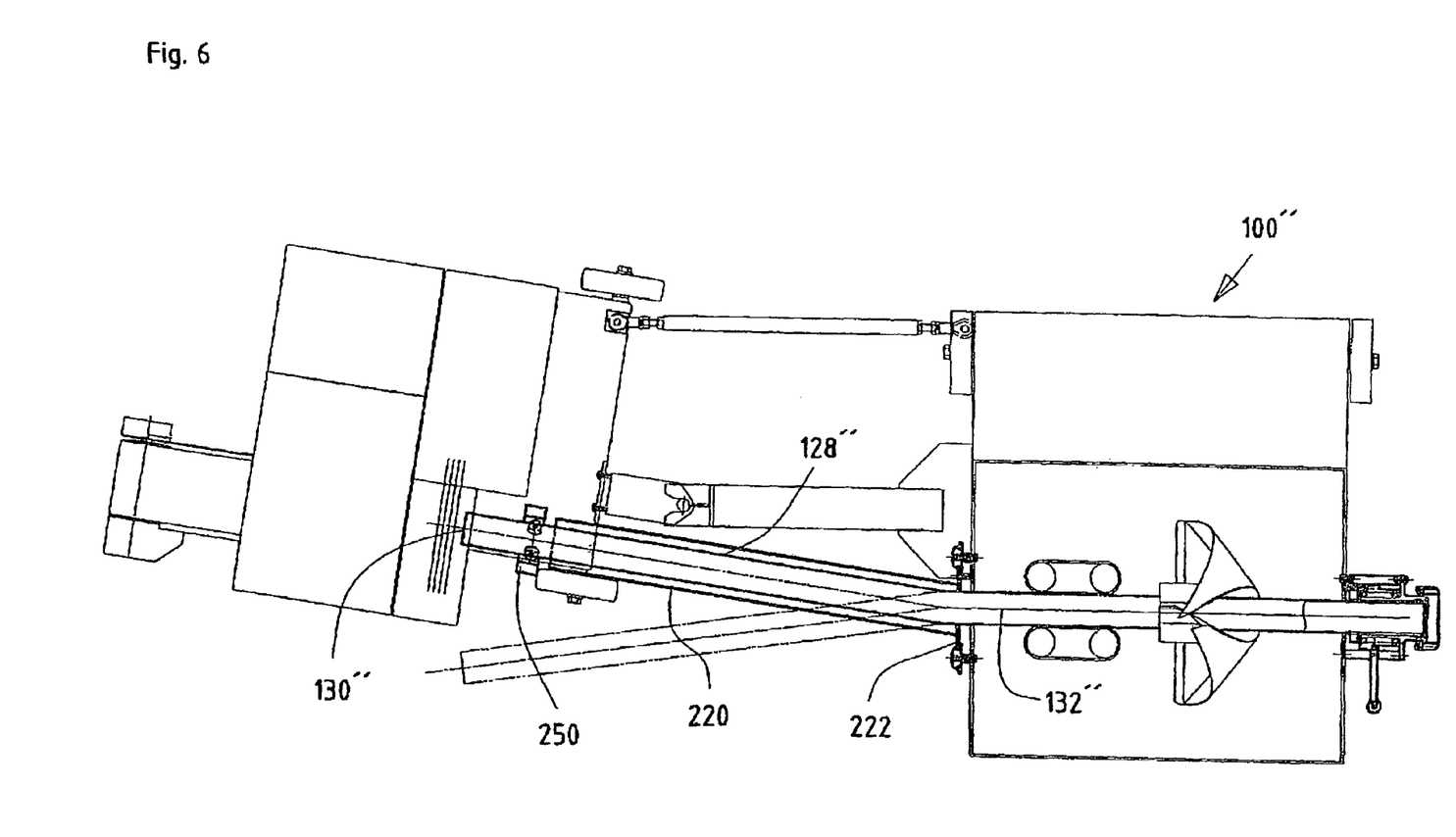
FIG. 6 Top view showing a third design of the invention-based device with angled feeder tube and net holder.
Figure 7:
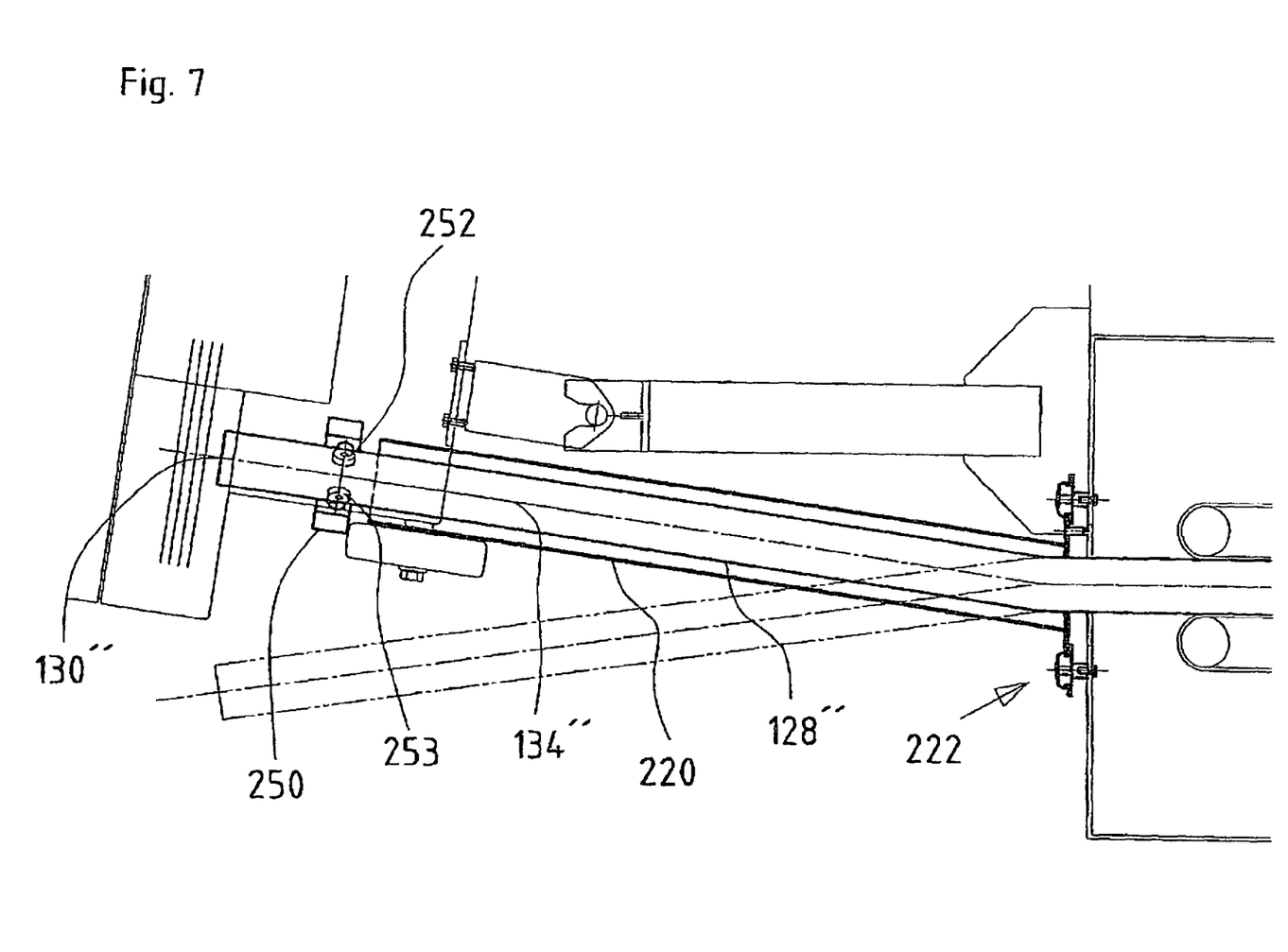
FIG. 7 Top view showing part of the second feeder tube segment with net holder according to the design shown in FIG. 6.

FIG. 6 shows in top view a third design of the invention-based device 100', which basically resembles the device in FIG. 1 but additionally features a net holder 220. The net holder is tube-shaped and runs coaxial with second feeder tube segment. It covers the second, angled feeder tube segment 128", ending just before its mouth. The feeder tube and the net holder together pivot around the same longitudinal axis 132". To achieve this, a net holder swivel bearing 222 pivots the net holder around the longitudinal axis 132" (cf. FIGS. 7 and 8).

At the front end, close to the feeder tube mouth 130", a second support 250 stabilizes the second feeder tube segment while it is in operating position. The support 250 includes cylinder-shaped rolling elements 252, 253, which are placed angularly offset underneath the second longitudinal axis 134". The rolling elements are pivoted around axes, which are vertically oriented to the second longitudinal axis 134" in a V-shaped assembly. Consequently, when the casing and/or the net casing are pulled off the feeder tube segment 128" or off the net holder, respectively, the rolling elements 252, 253 will be set in motion, thus preventing additional frictional resistance at the rolling elements. Frictional resistance arises only on the outer surface of the feeder tube where the roll elements 252 support the feeder tube.

Figure 8A:
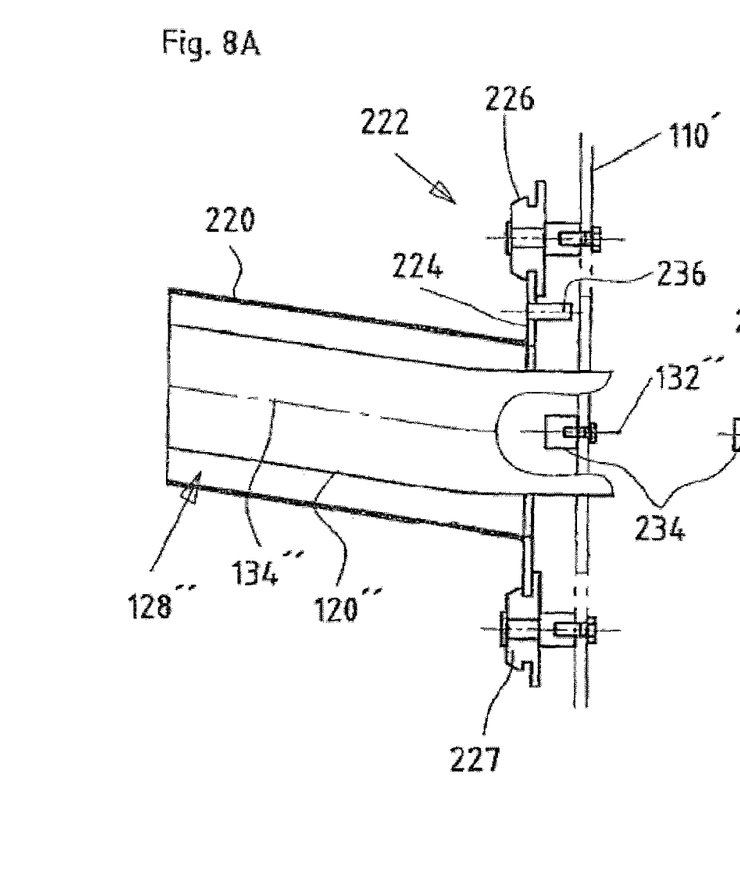
FIG. 8A, 8B Two detail views showing the feeder tube swivel bearing of the net holder according to the design shown in FIG. 6.
Figure 8B:
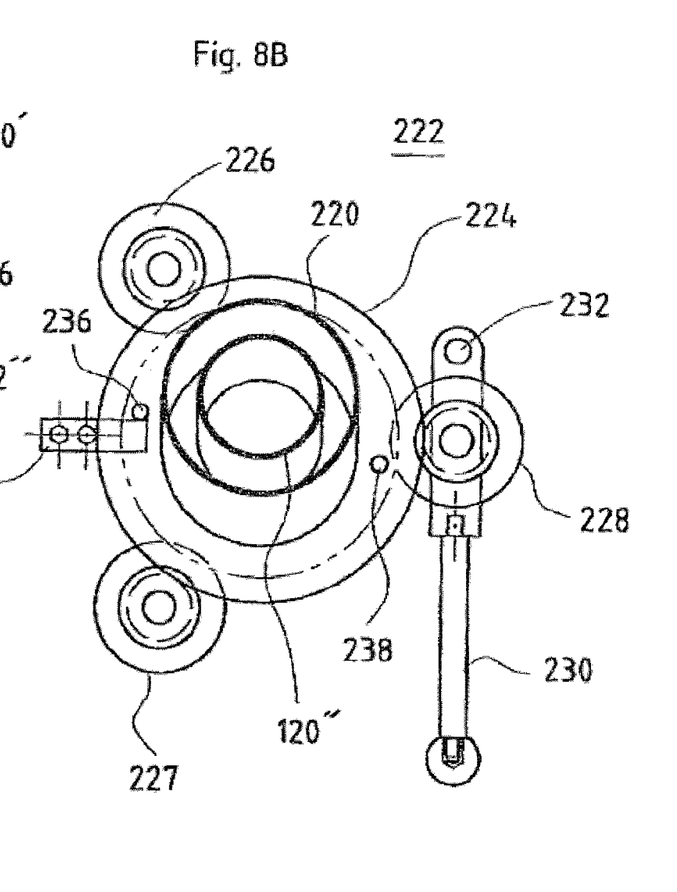

According to FIGS. 8A and 8B, the net holder swivel bearing 222 features disk 224 and three stabilizer and guide rolls 226, 227, 228. The disk 224 is attached to the net holder 220, in this case through welding. In the here depicted operating mode, the longitudinal axis of the net holder 220 and the longitudinal axis 134" of the feeder tube 120 coincide, i.e. in this example, the axis of the net holder 220 deviates by 8° from a vertical position at the disk 224.

In axial direction, the disk 224 is still located within the first feeder tube segment 128". The stabilizer and guide rolling elements 226, 227, 228 are connected to the housing wall 110' of the sealing unit in a way that positions the disk 224 vertical to the first longitudinal axis 132". As a result, the net holder 220 and the feeder tube 120" pivot around the same axis of gyration.

The top stabilizer and guide roll 228 is located at the lever 230. The lever is attached to the housing wall 110' with a hinge and can pivot around axis 232. Upon pivoting the lever 230 out of its position, the stabilizer and guide rolling elements will release the disk 224, and the idling net holder 220 can be pulled upward and away from the sealing unit 100' for maintenance or cleaning. This can also be done in the presence of the mounted feeder tube 120".

In this version, the net holder 220 does not rely on an active drive of its own but is carried along by the pivoting motion of the feeder tube 120". To ascertain that the net holder and the feeder tube maintain their coaxial alignment in all operating position, i.e. next to the closing unit, or pivoted away into its provisioning position, a limit stop 234 is affixed to the housing wall 110'. Two corresponding stop pins 236, 238 are placed at the disk 224. Limit stop and pins interact in a way that locks the disk 224 in position when the net holder 220 is horizontally aligned.

The net holder does not have to be tube-shaped. For instance, an open frame construction with bracing along the second feeder tube segment, such as multiple rods, may also be used. The significant criterion is that, if at all possible, the net must not touch the feeder tube segment 128" or the casing and casing supply underneath the net holder.

Figure 9:
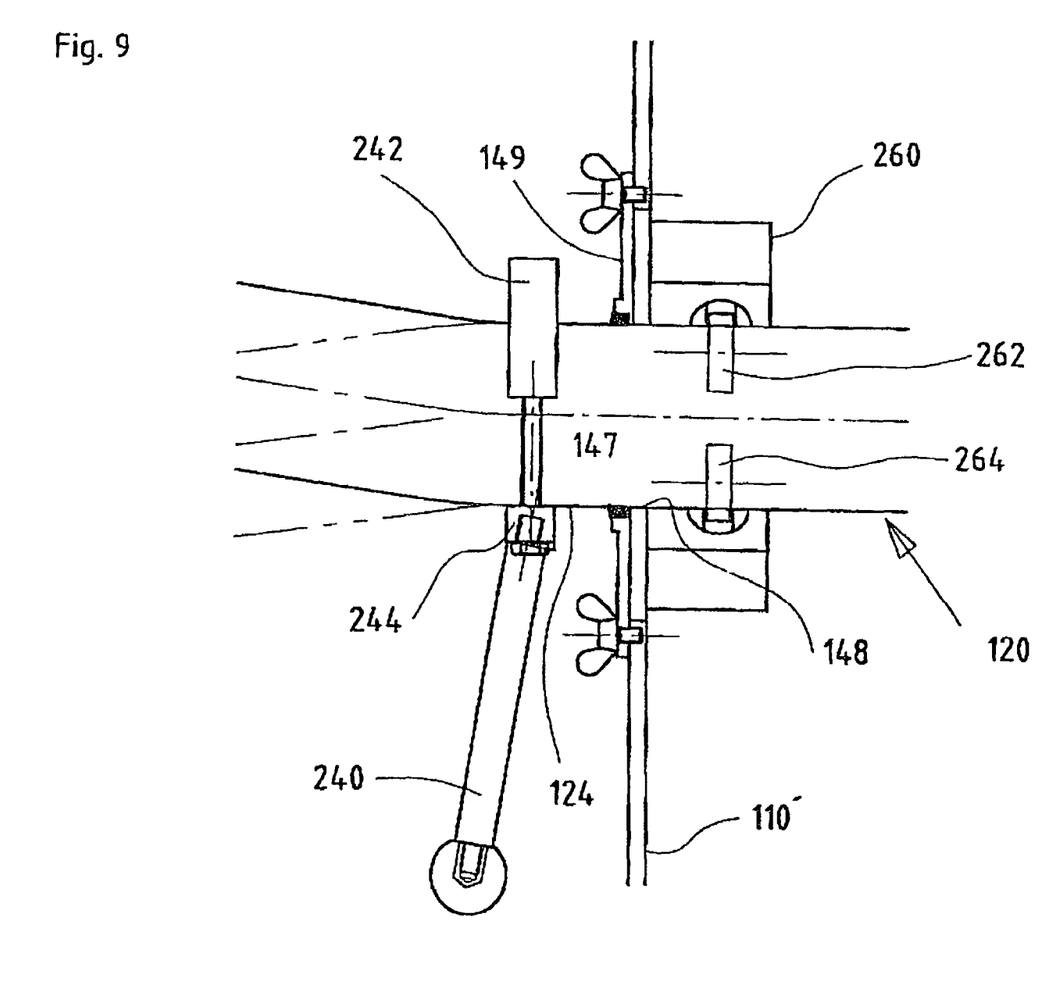
FIG. 9 Detail view showing the first feeder tube segment with support structures and manual drive for the feeder tube rotation.

FIG. 9 depicts a cutout of the design shown in FIG. 1. Details are shown for the area where the feeder tube segment 124 emerges from the housing wall 110' with the support 260, the manual drive or handle 240 to rotate the feeder tube 120, and the face plate 149. It is still the first segment of the feeder tube 124, which protrudes from the housing 110 through an opening 148 in the housing wall 110' on the side, which is opposite of the swivel bearing. The face plate 149 seals the opening 148 in the housing wall 110' from the feeder tube 120, thus protecting the housing from ingressing moisture and such. In flow direction 131 behind the opening 148, the faceplate 149 is flange connected to the housing wall 110' opposite the feeder tube 120. The seal is applied during manual operations with a manually loaded casing supply 139, which is usually soaked before use. The faceplate 149 features a flexible ring-shaped peripheral sealing lip 147, which forms a seal around the first feeder tube segment 124. In this assembly, the feeder tube 120 can be pulled out through the faceplate.

The support 260 with two stabilizing rolls 262, 264 supports the feeder tube swivel bearing 140. It is located in the area of the first feeder tube segment 124 and also on the side of the housing 110 opposite of the swivel bearing. The support 260 is attached from inside the housing on the housing wall 110'.

As shown in FIGS. 10A and 10B, the cylinder-shaped rolling elements 262, 264 are located angularly offset underneath the longitudinal axis of the feeder tube 120 and vertically abut the first feeder tube segment 124 in a V-shaped assembly. The rolling elements 262, 264 can be pivoted into two positions relative to the longitudinal feeder tube axis, so that their axes of rotation 266, 268 are either parallel or vertical to the first longitudinal axis. For this purpose, the rolling elements 262, 264 are seated in separate roller bearings 270, 272, which in turn are pivoted in a bearing 274. The rolling elements extend in vertical and radial direction toward the longitudinal axis of the feeder tube 120. Using the release handles 276,278, the roller bearings 270, 273 and consequently, the axes of rotation 268, 268 can be locked in the desired orientation and angle.

In the first manual mode, a position with parallel axes of rotation 266, 268 is selected. When the feeder tube 120 pivots around its longitudinal axis 132, the rolls 262, 264 will counter this motion only with rolling resistance, not with frictional resistance.

For the second, automatic operating mode however, the angle adjustment according to FIG. 10B is selected. Now, the axes of rotation 266, 268 are vertical to the first longitudinal axis 132 and the transport of the casing 118 over the first feeder tube segment encounters only rolling resistance, not frictional resistance. In this arrangement, frictional resistance is created only between casing and the outer feeder tube surface.

The support (strut) 260 is attached to the housing wall 110' using the screw fitting of the bearing body 274. The bearing body 274 has two slots 280, 281, which allow mounting the strut with variable spacing from the longitudinal feeder tube axis 132. This is a simple way to adapt the struts to feeder tubes with different diameters, so that the positioning of their longitudinal axis remains always the same.

Figure 11A:
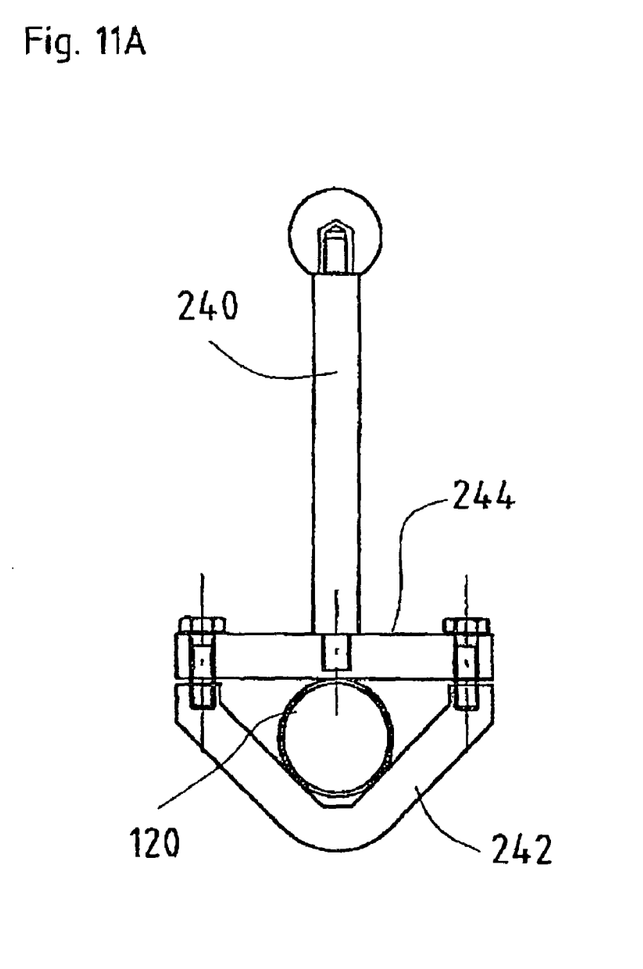
FIG. 11A, 11B Two detailed front views showing the design for the manual drive to rotate the feeder tube as also shown in FIG. 9.
Figure 11B:
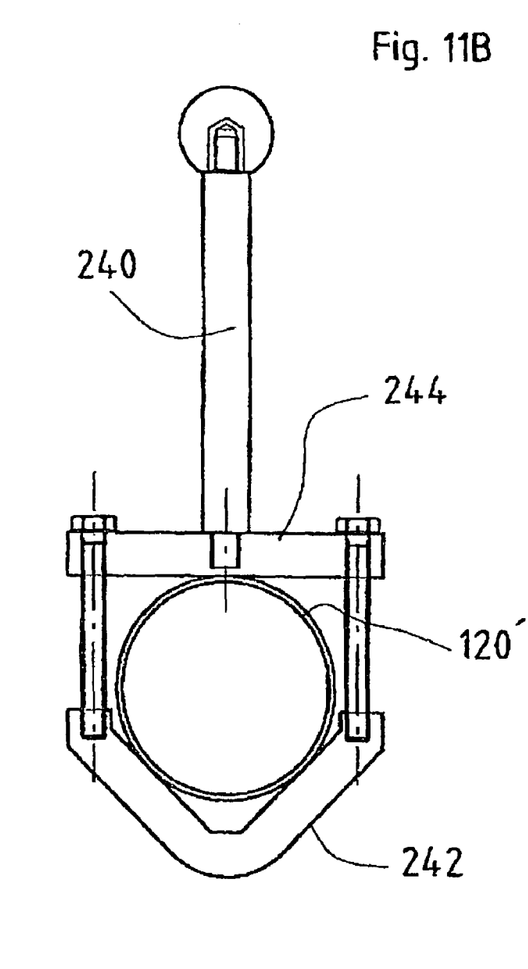

FIGS. 11A and 11B show front views of the manual drive to pivot the feeder tube, thus elaborating on details from FIG. 9. The manual drive consists of a handle 240, which is attached to a clamp device, with a base 242 in the shape of a prism and a clamping plate 244. The feeder tube 120 or 120''', respectively, is enclosed by the clamping base 242 and the clamping plate 244. The prism-shaped base 242 permits it to center feeder tubes 120, 120''' with variable outer diameters inside the clamp.

Figure 12:
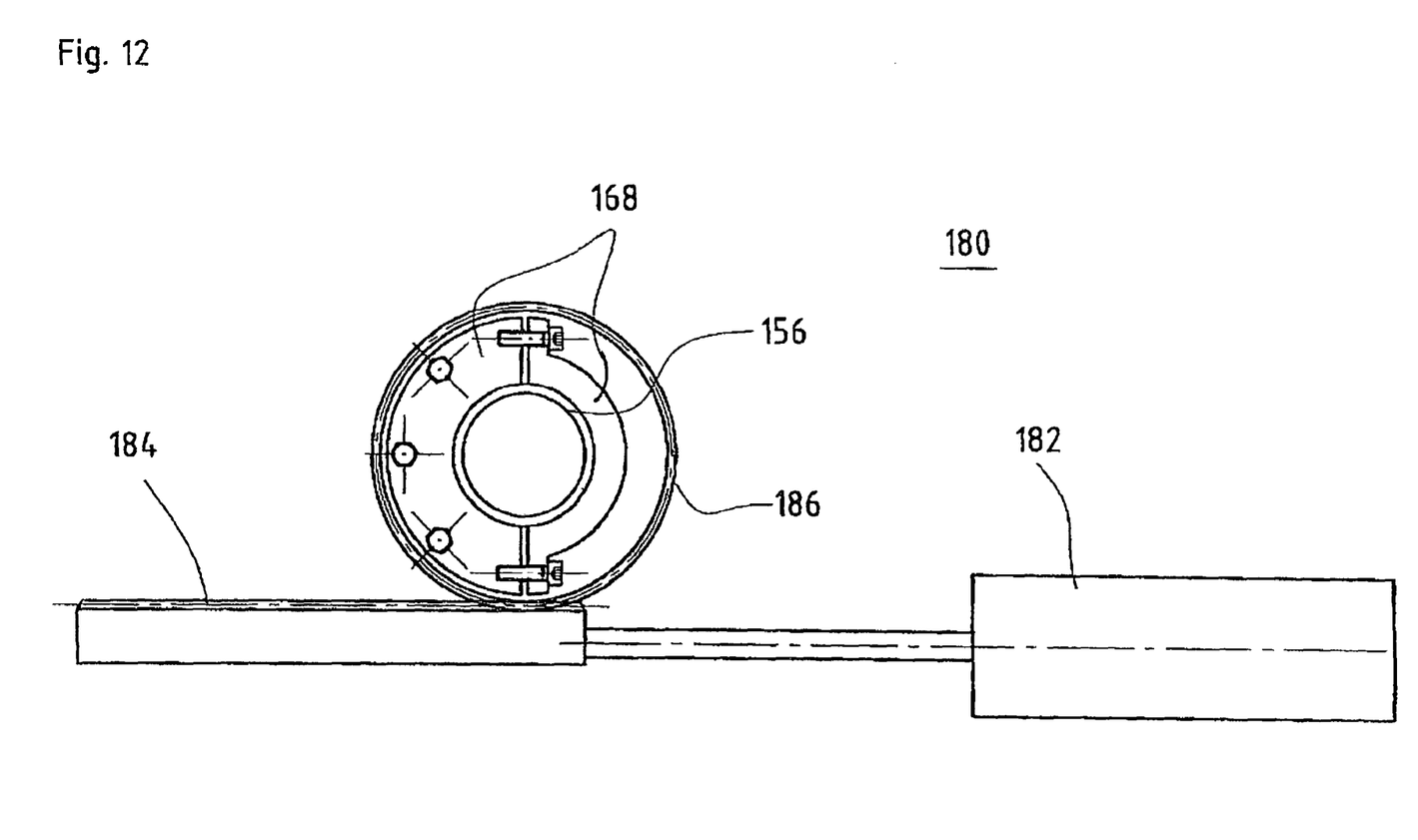
FIG. 12 Detailed front view of the design with motor drive to rotate the feeder tube.

FIG. 12 depicts in front view a motorized version with a motor drive 180 to pivot the feeder tube. Aside from the linear drive motor 182, the gear rack 184 and the gear ring 186, the clamping 168 is also clearly discernible in FIG. 12. The clamping consists of two ring halves. Put together, they form an opening, which is adapted to the outer diameter of the flange 156. Flange 156 is clamped into the opening. In the shown version of the design, the clamping device 168 is screwed to the second element 160 of the swivel bearing to entrain the clamping.

The invention claimed is:

1. A casing tube packaging device comprising:
   a single feeder tube connecting a casing fill unit to a single casing closing device,
   a hookup for attaching a first end of the feeder tube to the casing fill unit,
   a feeder tube mouth positioned at a second end of the feeder tube,
   the single feeder tube comprising a generally straight, first feeder tube segment, the first feeder tube segment extending from the hookup and having a first longitudinal axis, and a second feeder tube segment conjoined with the first feeder tube segment, the second feeder tube segment extending from the feeder tube mouth;
   the first feeder tube segment adapted to accept and conduct around its outer surface a plastic film casing formed around the first feeder tube segment from a plastic film strip infeed;
   the second feeder tube segment adapted to further conduct the plastic film casing onto the second feeder tube segment prior to operation of the device; and
   a feeder tube swivel bearing pivotable about the first longitudinal feeder tube axis, located upstream before the feeder tube first segment,
   wherein the single feeder tube exhibits at least one change of direction between the first and second feeder tube segment,
   wherein the single feeder tube is pivotable about the first longitudinal axis of the first feeder tube segment, and
   where the feeder tube swivel bearing comprises a first element configured to be attached to a housing about at least a portion of the single feeder tube and a second element, the single feeder tube being connected to the second element.

2. The device according to claim 1, wherein the first and second feeder tube segments are linked together as one piece.

3. The device according to claim 1, wherein the second feeder tube segment is a generally straight segment with a second longitudinal axis which forms an angle with the first longitudinal axis of less than 180°.

4. The device according to claim 1, wherein the second feeder tube segment is a generally straight segment with a second longitudinal axis, wherein the first and second feeder tube segments are connected by an intermediate segment such that the first and second feeder tube segments are staggered and parallel.

5. The device according to claim 1, wherein the single feeder tube is at least partially encased by a net holder in the area of the second feeder tube segment and further comprises a net holder swivel bearing, which allows pivoting around the first longitudinal axis.

6. The device according to claim 1, wherein the hookup comprises a coaxial flange; wherein the feeder tube can be inserted with the flange in the first element of the feeder tube swivel bearing and by means of clamping can be releasably connected to the second element of the feeder tube swivel bearing.

7. The device according to claim 6, wherein the feeder tube flange is sealed at its periphery from the first element of the feeder tube swivel connection.

8. The device according to claim 7, wherein the flange connects the first element of the feeder tube swivel bearing with the fill unit.

9. The device according to claim 1 further comprising a forming pad that encircles the single feeder tube in the feeder tube first segment where a plastic filmstrip infeed is formed into a plastic film casing by bringing together the longitudinal edges of the plastic film strip edge-to-edge;
   and further comprising a sealing unit in the feeder tube first segment downstream of the forming pad, which seals the adjacent longitudinal edges of the preformed casing on the single feeder tube.

10. The device according to claim 9, further comprising a housing around the sealing unit, the housing also being a support structure for the feeder tube swivel bearing, whereby the first element of the feeder tube swivel bearing protrudes from the housing.

11. The device according to claim 10, wherein the housing features an exit hole for the single feeder tube opposite to the first element of the feeder tube swivel bearing.

12. The device according to claim 11, further comprising a face plate for the exit hole in the housing, wherein the face plate abuts the single feeder tube via a peripheral flexible sealing lip of the face plate.

13. The device according to claim 9, wherein the first segment of the single feeder tube is supported by at least one rolling element downstream of the fusion or sealing unit.

14. The device according to claim 13, wherein the at least one rolling element is at least two angularly offset rolling elements, which stabilize the single feeder tube.

15. The device according to claim 14, wherein the rolling elements are pivoted around axes and can themselves pivot between a first position oriented perpendicular to the first longitudinal axis of the first feeder tube segment, and a second position parallel to the first longitudinal axis of the first feeder tube segment.

16. The device according to claim 1, further comprising a drive to swivel the single feeder tube around the first longitudinal axis using a drive motor, a gear element that connects to the first feeder tube segment and a second gear element, which is coupled to a drive motor.

17. The device according to claim 1, further comprising a handle adapted to manually pivot the single feeder tube around the first longitudinal axis of the first feeder tube segment.

* * * * *